Patented Feb. 26, 1924.

1,485,115

UNITED STATES PATENT OFFICE.

FRANK L. GUITTARD AND ALFRED L. CARRIL, OF SAN FRANCISCO, CALIFORNIA, ASSIGNORS, BY MESNE ASSIGNMENTS, OF ONE-THIRD TO FRANK X. SCHWARZENBEK, OF SAN FRANCISCO, CALIFORNIA.

PROCESS OF MAKING CONFECTIONS.

No Drawing. Application filed August 1, 1922. Serial No. 579,027.

*To all whom it may concern:*

Be it known that we, FRANK L. GUITTARD and ALFRED L. CARRIL, citizens of the United States, residing at San Francisco, in the county of San Francisco and State of California, have invented new and useful Improvements in Processes of Making Confections, of which the following is a specification.

The present invention relates to improvements in the art of making confections particularly in the application of chocolate coatings to candy centers and resides in the provision of a process by means of which we may employ the highly desirable and well known "pan" method involving the use of the "Dragee" machine. This machine is used for applying coatings other than chocolate to candy centers and comprises a spherical container which is rotated at a low rate of speed and through resultant action causes coating syrups to be applied to candy centers.

Heretofore it has been considered practically impossible to use "pan" or Dragee machines in the work of applying chocolate coatings to candy centers, due to the fact that the chocolate syrup or coating when cooling and beginning to set or harden, will cause the centers and coating to form a homogeneous mass instead of being separated in individual candy pieces, as is the case when the ordinary sugar coatings are used. By the term chocolate coating, we mean a melted chocolate which contains a large percentage of cocoa butter and which is sold commercially in slabs that are melted to prepare the chocolate for application to candy centers. "Pan" or "Dragee" machines are desirable in the manufacture of candy in that they eliminate manual labor and provide for a cheaper and more expeditious production of larger quantities of better appearing and more uniform candy pieces than is possible with other machines or by hand methods.

Our invention takes into consideration a process by means of which the "Dragee" or moving pan machines may be used in the applying of chocolate coatings to candy centers without the objections which have heretofore made it practically impossible to use such machines for chocolate coating work. By the peculiar process of our invention we provide for the production of candy in larger quantities and in less time and at less expense than is possible with other machines or by hand methods.

A further object of the invention is to provide a process of the character described by means of which the candy produced will have a high melting point and will be suitable for packing and shipping purposes in hot weather or in other words as a "summer" candy, where ordinarily chocolate coated candy is not so suitable.

In carrying out our invention we place within the moving pan or container of a machine such as commonly employed, for example, a "Dragee" machine, the centers which are to be coated with chocolate. It is thought unnecessary to illustrate the particular machine used as it is well known and commonly employed in the art of making candy. Any suitable quantity of centers, which may be nuts, or any other suitable candy center material, may be placed in the machine. The machine is then set in motion and the centers are acted upon centrifugally, being moved or agitated on the walls of the spherical container of the machine. We then add melted commercial chocolate coating heated to a temperature of approximately 95° F., which coating is added only in such proportions as necessary to produce a light coating of chocolate on the centers. As soon as the coating is poured into the machine, it is acted upon by the pan as well as the centers, and due to this action the centers will accumulate said coating. As to the time required to cause a small quantity of the chocolate coating to be applied to the centers, this depends upon the amount of centers to be coated and the character of the chocolate coating, and is subject to the judgment of the operator of the machine, from two to seven minutes ordinarily being sufficient. However, the chocolate syrup or coating begins to cool as soon as it is under treatment in the machine and if allowed to become too cool, it will begin to set and cause the quantity of centers and chocolate to form a mass. For this reason care must be exercised so that the next step of our process may be carried out before the chocolate cools to the extent that it will form a mass. When the coating has been applied to the centers, the individual candy pieces which are then in the making are moist and of a sticky nature. While the candy pieces are in this condition and before the chocolate has set and cooled to the extent above pointed out, the operator then causes to be directed into the pan a quantity of dry powdered edible substance such as chocolate sufficient to cause the moist pieces of candy to absorb the ground chocolate and form a coating upon the individual candy pieces. The operation of the machine is continuous and the time required to cause an application of the dry chocolate to the moist candy is subject to the judgment of the operator. After the application of dry chocolate has been made, a second application of melted chocolate coating is introduced into the pan and the candy pieces will take on another light coating. A second charge of dry powdered chocolate is then introduced. This operation is continued by first applying a chocolate coating in hot melted form and then applying a dry powdered chocolate and so on until the proper thickness of coating is provided on the individual pieces of candy and said pieces have a smooth finish whereupon they are ready for removal from the pan. The machinery is then stopped and the individual pieces taken out and placed in trays and preferably allowed to stand for twelve hours so as to thoroughly dry. It is then placed back into the pan and a certain amount of what is known as "confectioner's glaze," is used in just sufficient quantity to provide a light coating on the individual pieces whereby the finished candy will have a glossy finish, the glaze coating being air tight. Candy thus produced will have a high melting point due to their being contained in the chocolate coatings a greater percentage of dry chocolate, than is customary where only the commercial chocolate coating is used. It will not be affected by hot weather as is the ordinary chocolate coated candy. Due to the centrifugal action of the machine, the individual pieces of candy will be uniform and of a smooth appearance regardless of the irregularities of the centers.

In coating peanut centers with chocolate whole peanuts are preferably used and to avoid separation of the halves of the peanuts, a sugar syrup is poured onto the peanuts in the container before the container is set in motion and the container is then revolved slowly so that the peanut centers will have applied thereto a sugar coating which will serve to hold the halves of the peanuts together during the operation of coating the same with chocolate. Other than this, the same operations are carried out as when coating centers other than peanuts.

While we prefer to use the commonly employed revolving spherical pan having an opening to one side of its uppermost point, we do not limit ourselves to this type of machine and may employ any container or support which may be moved in such manner that centers and coating therefor will be treated in accordance with the invention, in other words, such that the coating material will be applied to the centers as a result of the movement of the container or support.

By the term dry powdered chocolate, we mean any powdered or finely divided derivative of the cocoa bean.

While we prefer to introduce melted chocolate coating at a temperature of substantially 95° F., we may, however, introduce the melted chocolate at any temperature provided that from its introduction it will remain warm to permit of the application of a coating to the centers and of the introduction of the dry powdered chocolate before the melted chocolate cools or begins to set or harden to such an extent that the centers and coating material will form a homogeneous mass.

Although the invention relates to the use of pan machines in chocolate coating work, we wish it to be understood that one of the most essential features of the invention is the process of applying the warm melted chocolate coating to the centers and before hardening and setting of such coatings applying dry powdered chocolate. These steps are alternated until the desired thickness of coating is produced. Therefore, we may consider this to be a part of the invention regardless of any particular machine and may carry out such steps of applying said coating materials through any machine or agency which is capable of being used.

We claim:

1. The process of applying chocolate coatings to candy centers which consists in subjecting candy centers and a warm melted chocolate coating to centrifugal action within a container to cause a light coating of chocolate to be applied to the centers and then adding dry powdered chocolate to the coated centers preliminary to the setting of the chocolate coating and while the coated centers are subjected to centrifugal action and then alternately applying melted, warm chocolate coating and dry powdered chocolate while subjecting the candy pieces to continuous centrifugal action until the coatings are of the desired thickness.

2. The process of applying chocolate coatings to candy centers which consists in subjecting candy centers and a warm melted chocolate coating to centrifugal action within a container to cause a light coating of chocolate to be applied to the centers, then adding dry powdered chocolate to the coated centers preliminary to the setting of the chocolate coating and while the coated centers are subjected to centrifugal action, then alternately applying melted, warm chocolate coating and dry powdered chocolate while subjecting the candy pieces to continuous centrifugal action until the coatings are of the desired thickness, drying the individual coated pieces of candy and then subjecting the individual coated pieces of candy to centrifugal action in the presence of a liquid finishing coat.

3. The process of applying chocolate coating to centers for candy which consists in placing centers in a revolving container, introducing into the container a quantity of warm melted chocolate sufficient to form a light coating on the centers then introducing into the container dry powdered chocolate.

4. The process of applying chocolate coating to centers for candy which consists in placing centers in a revolving container, introducing into the container a quantity of warm melted chocolate sufficient to form a light coating on the centers then introducing into the container dry powdered chocolate, then alternately introducing warm melted chocolate and dry powdered chocolate until coatings of the desired thickness are produced on the candy centers.

5. The process of applying chocolate coatings to candy centers which consists in placing centers in a container, causing movement of the centers while in the container, introducing warm melted chocolate into the container during the movement of the centers, then introducing into the container dry powdered chocolate.

6. The process of applying chocolate coatings to candy centers which consists in placing centers in a container, causing movement of the centers while in the container, introducing warm melted chocolate into the container during the movement of the centers, then introducing into the container dry powdered chocolate and alternately introducing warm melted chocolate and dry powdered chocolate until coatings of the desired thickness are produced on the centers.

7. The process of applying chocolate coatings to candy centers which consists in causing movement of the candy centers, adding a warm melted chocolate to the centers and continuing movement of the centers after such addition of the warm melted chocolate until a coating of the chocolate is applied to said centers and before cooling to the extent of setting and hardening of the chocolate applied to the centers, adding while continuing movement of the centers a quantity of dry powdered chocolate.

8. The process of applying chocolate coatings to candy centers which consists in causing movement of the candy centers, adding a warm melted chocolate to the centers and continuing movement of the centers after such addition of the warm melted chocolate until the coating of the chocolate is applied to said centers and before cooling to the extent of setting and hardening of the chocolate applied to the centers, adding while continuing movement of the centers a quantity of dry powdered chocolate and alternately adding to the coated centers applications of warm melted chocolate and dry powdered chocolate until coatings of the desired thickness are produced on the centers.

9. The process of applying chocolate coatings to candy centers which consists in first applying to candy centers a coating of warm melted chocolate and before cooling of the applied chocolate and setting or hardening thereof, adding a dry powdered chocolate and then alternately adding warm melted chocolate and dry powdered chocolate until the centers are coated with chocolate to the desired thickness.

10. The process of applying chocolate coatings to candy centers which consists in first applying to candy centers a coating of warm melted chocolate and before cooling of the applied chocolate and setting or hardening thereof, adding a dry powdered chocolate.

11. The process of applying chocolate coating to candy centers which consists in placing the centers in a container, causing movement of the centers while in the container, introducing warm melted chocolate into the container during movement of the centers, then introducing a dry powdered edible substance into the container during movement of the centers and then alternately introducing warm melted chocolate and dry powdered edible substance until coatings of the desired thickness are produced on the centers.

FRANK L. GUITTARD.
ALFRED L. CARRIL.